United States Patent

Murata

(10) Patent No.: US 12,152,907 B2
(45) Date of Patent: Nov. 26, 2024

(54) MEASUREMENT DEVICE AND LIGHT PROJECTION SYSTEM USING THE MEASUREMENT DEVICE

(71) Applicant: Murata Manufacturing Co., Ltd., Nagaokakyo (JP)

(72) Inventor: Keiji Murata, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 940 days.

(21) Appl. No.: 17/190,107

(22) Filed: Mar. 2, 2021

(65) Prior Publication Data

US 2021/0180950 A1 Jun. 17, 2021

Related U.S. Application Data

(63) Continuation of application No. PCT/JP2019/027092, filed on Jul. 9, 2019.

(30) Foreign Application Priority Data

Nov. 14, 2018 (JP) ................................ 2018-213693

(51) Int. Cl.
- *G01C 3/08* (2006.01)
- *G01B 11/02* (2006.01)

(52) U.S. Cl.
CPC .............. *G01C 3/08* (2013.01); *G01B 11/026* (2013.01)

(58) Field of Classification Search
CPC ..... G01C 3/08; G01B 11/026; G02B 27/0025
(Continued)

(56) References Cited

U.S. PATENT DOCUMENTS

| 5,737,084 A | 4/1998 | Ishihara |
| 5,946,100 A | 3/1999 | Ishihara |

(Continued)

FOREIGN PATENT DOCUMENTS

| JP | H09257440 A | 10/1997 |
| JP | 2008281719 A | 11/2008 |

(Continued)

OTHER PUBLICATIONS

Written Opinion of the International Search Authority issued for PCT/JP2019/027092, date of mailing Sep. 10, 2019.

(Continued)

*Primary Examiner* — Isam A Alsomiri
*Assistant Examiner* — Joseph C Fritchman
(74) *Attorney, Agent, or Firm* — ArentFox Schiff LLP

(57) ABSTRACT

Disclosed herein is a measurement device capable of measuring distance to an object. The measurement device comprises an illumination optical system configured to emit irradiation light having a predetermined pattern onto an object through a first optical path and a second optical path different from each other, and an observation system configured to observe a first light source image projected onto the object through the first optical path and a second light source image projected onto the object through the second optical path. The illumination optical system is configured to focus light through the first optical path and light through the second optical path on predetermined positions in a plan view of the object viewed along a traveling direction of the irradiation light. The measurement device measures a distance to the object based on the first light source image and the second light source image observed by the observation system.

12 Claims, 16 Drawing Sheets

(58) Field of Classification Search
USPC .............................................................. 356/4
See application file for complete search history.

(56) References Cited

U.S. PATENT DOCUMENTS

| | | | |
|---|---|---|---|
| 6,108,090 | A | 8/2000 | Ishihara |
| 6,373,978 | B1 | 4/2002 | Ishihara |
| 8,411,249 | B2 | 4/2013 | Hidaka et al. |
| 2009/0323036 | A1 | 12/2009 | Hidaka et al. |
| 2014/0313524 | A1* | 10/2014 | Banyay .................. A61C 19/04 433/29 |

FOREIGN PATENT DOCUMENTS

| | | | |
|---|---|---|---|
| JP | 2010008408 | A | 1/2010 |
| JP | 2012229983 | A | 11/2012 |
| JP | 2013181961 | A | 9/2013 |
| JP | 2016102667 | A | 6/2016 |
| WO | 2009139189 | A1 | 11/2009 |

OTHER PUBLICATIONS

International Search Report issued for PCT/JP2019/027092, date of mailing Sep. 10, 2019.

* cited by examiner

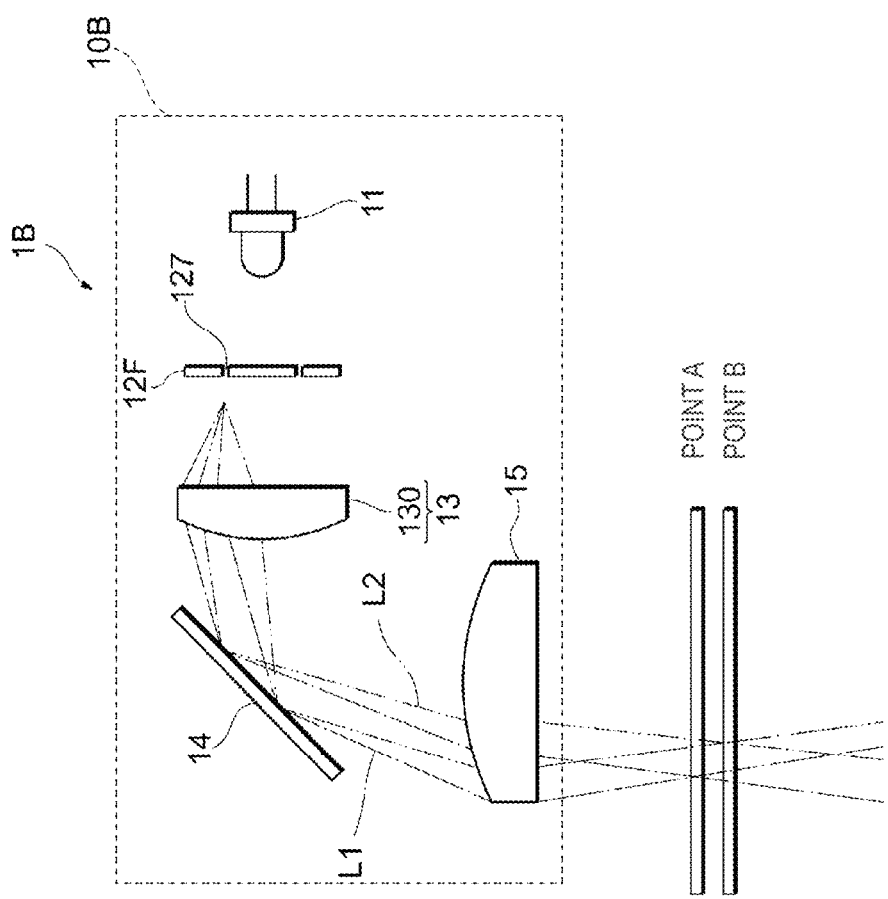

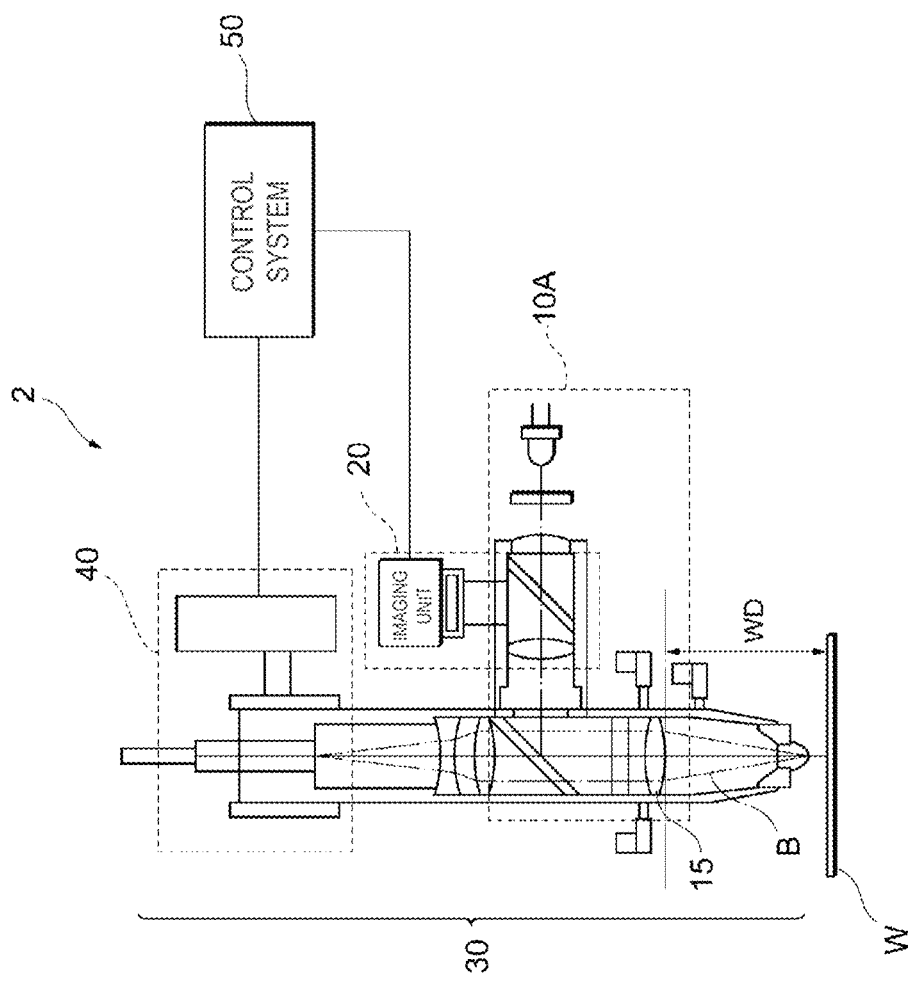

MEASUREMENT DEVICE AND LIGHT PROJECTION SYSTEM USING THE MEASUREMENT DEVICE

CROSS-REFERENCE TO RELATED APPLICATIONS

The present application is a continuation of International application No. PCT/JP2019/027092, filed Jul. 9, 2019, which claims priority to Japanese Application No. 2018-213693, filed on Nov. 14, 2018, the entire contents of each of which are incorporated herein by reference.

TECHNICAL FIELD

The present disclosure relates to a measurement device and a light projection system that uses the measurement device.

BACKGROUND

In the field of optics, there is method for calculating a distance to an object by detecting reflected light of light emitted onto the object. In one approach, an optical displacement sensor receives reflected light that has passed through a slit plate from light emitted onto an object, and detects an amount of displacement of the object based on a change in an amount of received light.

In another approach, an optical microscope projects a pattern image onto a sample using two light-shielding patterns, and calculates a distance to the sample on the basis of the two projected images. In this optical microscope, the two light-shielding patterns are arranged so that distances from an optical axis are different from each other, and thus the two images projected onto the sample are focused to have different depths from each other through a lens. This causes a difference in contrast between the two images detected by the sensor, and thus the distance to the sample can be calculated based on the difference in contrast.

According to the displacement sensor in the first approach, it is possible to detect whether or not the distance from the object has changed, but it is not possible to detect the distance itself. On the other hand, according to the optical microscope in the second approach, although the distance to the object can be measured, the images by the two light-shielding patterns are transmitted through positions in which distances from the optical axis of the lens are different, and therefore, distortion and blurring that are different from each other may occur in the image due to aberration and distortion of the lens, and the accuracy of measuring the distance may deteriorate.

SUMMARY

Aspects of the present disclosure are directed to addressing these shortcomings. The present disclosure has been made in view of such circumstances, and an object of the present disclosure is to provide a measurement device and a light projection system that uses the measurement device. The measurement device is capable of measuring an object while suppressing influence of distortion of an image caused by an optical system.

A measurement device according to an aspect of the present disclosure includes an illumination optical system configured to emit irradiation light having a predetermined pattern on an object through a first optical path and a second optical path different from each other, and an observation system configured to observe a first light source image projected onto the object through the first optical path and a second light source image projected onto the object through the second optical path, in which the illumination optical system is configured to focus light through the first optical path and light through the second optical path on predetermined positions in a plan view of the object viewed along a traveling direction of the irradiation light, the positions being different from each other in the traveling direction of the irradiation light, and wherein the measurement device measures a distance to the object based on the first light source image and the second light source image observed by the observation system.

A measurement device according to another aspect of the present disclosure includes an illumination optical system configured to emit irradiation light having a predetermined pattern onto an object through a first optical path and a second optical path different from each other, and an observation system configured to observe a first light source image projected onto the object through the first optical path and a second light source image projected onto the object through the second optical path, in which the illumination optical system is configured to focus light on positions having equal distance from an optical axis of the illumination optical system in a plane direction with the optical axis as a normal, the positions being different from each other in a traveling direction of the irradiation light, in the first optical path and the second optical path, and wherein the measurement device measures a distance to the object based on the first light source image and the second light source image observed by the observation system.

According to the present disclosure, even when aberration occurs in a first optical path and a second optical path, the influence of the aberration appearing is the same, and thus it is possible to provide a measurement device capable of measuring an object while suppressing the influence of distortion of an image caused by an optical system and a light projection system using the measurement device.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 10 is a diagram illustrating an overall configuration of a measurement device according to a third embodiment of the present disclosure.

FIG. 15 is a diagram illustrating an overall configuration of a laser beam projection system to which the measurement device according to the first embodiment of the present disclosure is applied.

DETAILED DESCRIPTION

Figure 1:
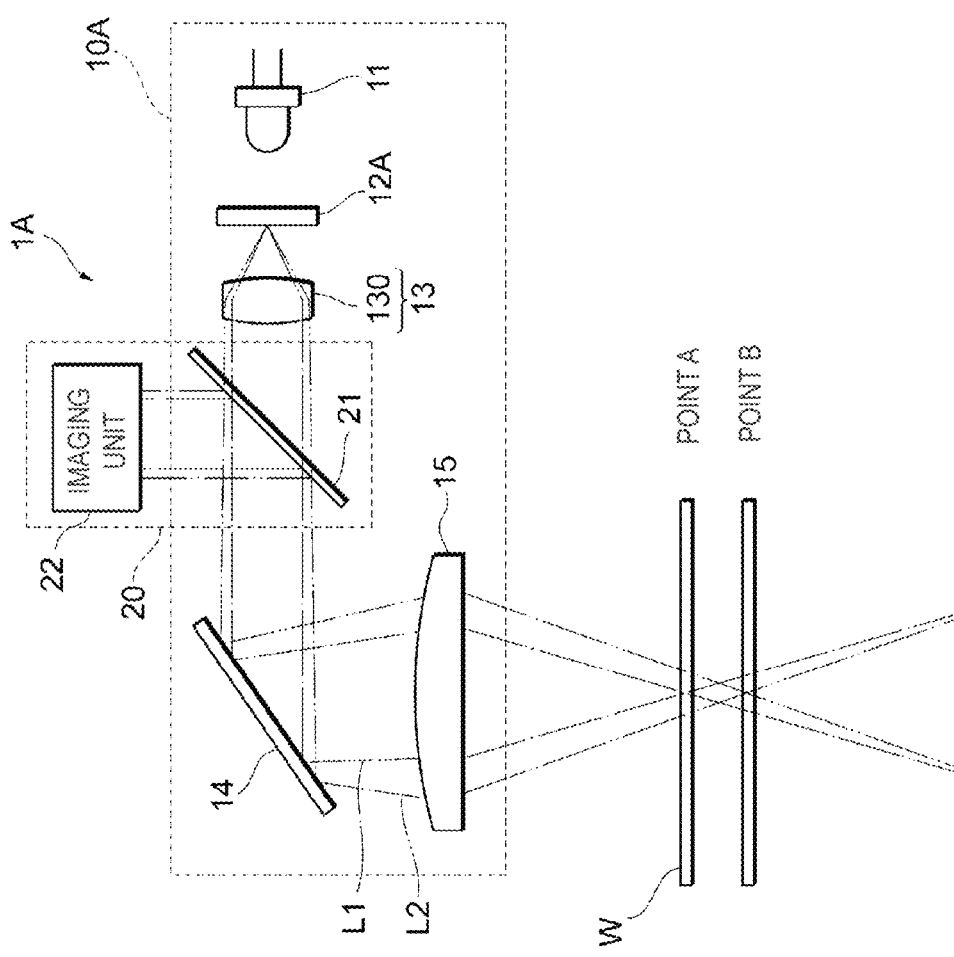
FIG. 1 is a diagram illustrating an overall configuration of a measurement device according to a first embodiment of the present disclosure.

Hereinafter, embodiments of the present disclosure will be described. Note that, the same or similar components are denoted by the same or similar reference numerals in the following description of the drawings. The drawings are illustrative, and dimensions and shapes of respective parts are schematic and should not be construed as limiting the technical scope of the present disclosure to the embodiments.

Figure 2:
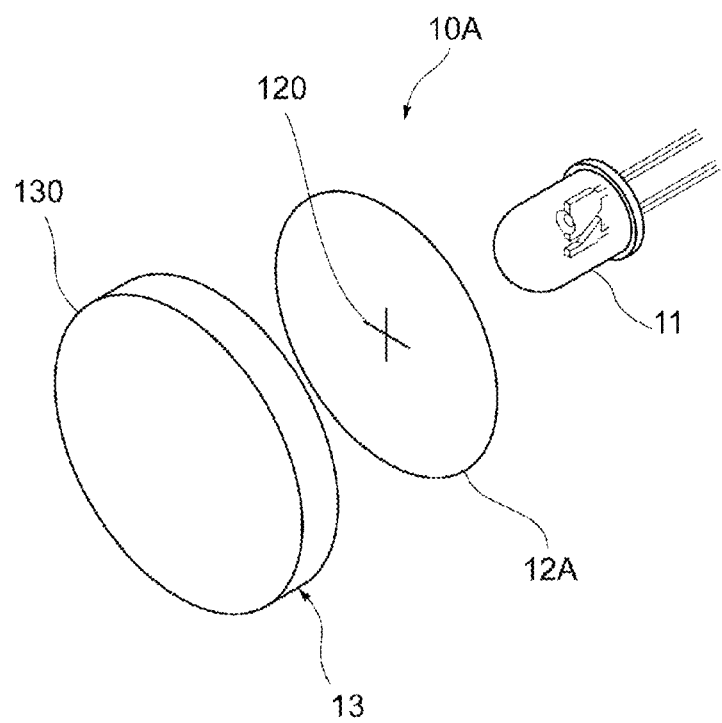
FIG. 2 is a perspective view illustrating a perspective structure of an illumination optical system in the measurement device according to the first embodiment of the present disclosure.
Figure 3:
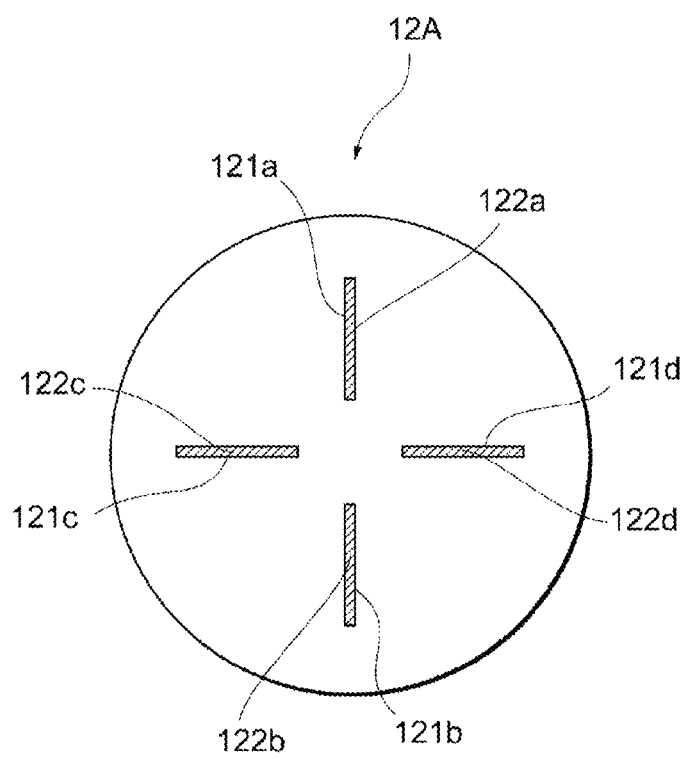
FIG. 3 is an enlarged plan view of a pattern plate in the measurement device according to the first embodiment of the present disclosure.

Referring to FIG. 1 to FIG. 3, a measurement device according to a first embodiment of the present disclosure will be described. FIG. 1 is a diagram illustrating an overall configuration of the measurement device according to the first embodiment of the present disclosure. FIG. 2 is a perspective view illustrating a perspective structure of an illumination optical system in the measurement device according to the first embodiment of the present disclosure. FIG. 3 is an enlarged plan view of a pattern plate in the measurement device according to the first embodiment of the present disclosure.

As illustrated in FIG. 1, a measurement device IA includes an illumination optical system 10A that projects pattern light of a predetermined pattern onto an object W, and an observation system 20 that can observe a light source image projected onto the object W.

The illumination optical system 10A configures a so-called critical illumination that emits irradiation light so that a light source image is formed in the vicinity of the object W. Specifically, the illumination optical system 10A includes, for example, a light source 11, a pattern plate 12A, a lens unit 13, a mirror 14, and a condenser lens 15.

In some aspects, the light source 11 emits irradiation light.

The pattern plate 12A is provided on an optical path of the irradiation light emitted from the light source 11. The pattern plate 12A configures a pattern of pattern light projected onto the object W. The pattern plate 12A includes a transmissive portion for transmitting light and a dimming portion for blocking or dimming light. The pattern of the pattern light is determined by an arrangement of the transmissive portion and the dimming portion. In the embodiment, the pattern plate 12A has a circular flat plate shape as illustrated in FIG. 2, and a cross-shaped slit 120 is formed in the vicinity of the center of the pattern plate 12A. The slit 120 configures the transmissive portion for transmitting the irradiation light, and a region other than a region in which the slit 120 is formed configures the dimming portion for blocking or dimming the irradiation light. Note that, in order to diffuse the light transmitted through the slit 120, the pattern plate 12A may be formed by bringing a thinly processed mask member into close contact with a glass surface that is processed into a rough surface, or by depositing a mask such as chromium on the glass surface, or may be also formed by distributing a fluorescent material in the shape. Alternatively, a diffusion plate may be provided before or after the pattern plate.

FIG. 3 is a plan view illustrating an enlarged region in which the cross-shaped slit 120 is formed. As illustrated in FIG. 3, the cross-shaped slit 120 includes two rectangular slits 121$a$ and 121$b$ arranged side by side in a vertical direction of the paper, and two rectangular slits 121$c$ and 121$d$ arranged side by side in a horizontal direction.

Polarizers 122$a$ and 122$b$ are provided in the two slits 121$a$ and 121$b$, respectively, and polarizers 122$c$ and 122$d$ are provided in the two slits 121$c$ and 121$d$, respectively. The polarizers 122$a$ and 122$b$ and the polarizers 122$c$ and 122$d$ are polarizers that transmit light in different polarization directions from each other. Accordingly, the pattern light generated by the pattern plate 12A includes light in two types of polarization directions, that is, the light transmitted through the slits 121$a$ and 121$b$, and the light transmitted through the slits 121$c$ and 121$d$. Note that the two types of polarization directions may be, for example, directions orthogonal to each other.

The lens unit 13 includes a lens 130. The lens 130 is a specific example of an optical member that guides the irradiation light in a predetermined direction. In this embodiment, the lens 130 has a circular flat plate shape. The material of the lens 130 is not particularly limited, but the lens 130 is made of, for example, crystal including artificial crystal. The crystal has a high transmittance in a wide range of wavelengths as compared to other materials such as glass and the like, and even when transmitting light having the relatively short wavelength and strong energy (for example, deep ultraviolet light), optical characteristics are less likely to be impaired, and the progress of deterioration is slow. In addition, the crystal has excellent water resistance because the crystal does not have deliquescence.

The crystal is a uniaxial crystal having an optical axis in one direction. Therefore, in a case where a traveling direction of the light that is transmitted through the crystal is not parallel to the optical axis of the crystal, the light that is transmitted through the crystal is traveled to be separated into an ordinary ray and an extraordinary ray in which vibration surfaces are different from each other, and a so-called birefringence is generated. This is because of a structure of the crystal, that is, a refractive index differs by the vibration surface due to the fact that a phase velocity of the ray differs depending on the traveling direction. In the embodiment, the lens 130 is arranged so that the traveling direction of the pattern light emitted from the pattern plate 12A and the optical axis of the lens 130 are not parallel to each other. As described above, the pattern light including the light having the two types of polarization directions is refracted at different refraction angles from each other in the lens 130 and travels separately in a first optical path L1 and a second optical path L2, as described above.

Note that the embodiment shows the configuration in which the lens unit 13 has one lens 130, but the number, the shape, the material, and the like of lenses included in the lens unit 13 are an example and not limited to this. Further, the material of the lens 130 is not limited to crystal, and may be, for example, another uniaxial crystal, or may be a biaxial crystal. Further, the optical member is not limited to the lens, and may be, for example, a prism.

The pattern light transmitted through the lens 130 is reflected by the mirror 14, is condensed by the condenser lens 15, and is projected onto the object W. Details of the light source image formed in the vicinity of the object W will be described later.

The observation system 20 includes, for example, a half mirror 21 and an imaging unit 22.

The half mirror 21 transmits a part of the pattern light and reflects a part of light reflected by the object W toward the imaging unit 22. Note that the half mirror 21 is included in the observation system 20 and also included in the illumination optical system 10A.

The imaging unit 22 receives the light reflected by the half mirror 21, thereby capturing a light source image of the pattern light projected onto the object W. Note that the imaging unit 22 is a specific example for observing the light source image, and the structure for observing an image is not limited thereto.

Figure 4A:
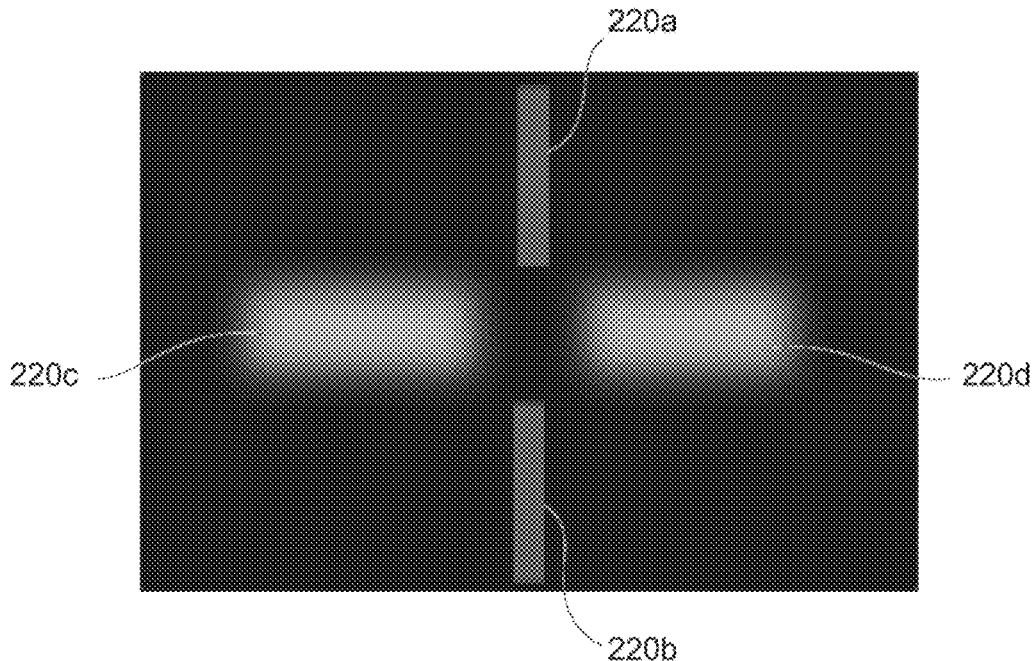
FIG. 4A is a diagram illustrating an image captured by an imaging unit in a case where an object is at a point A.
Figure 4B:
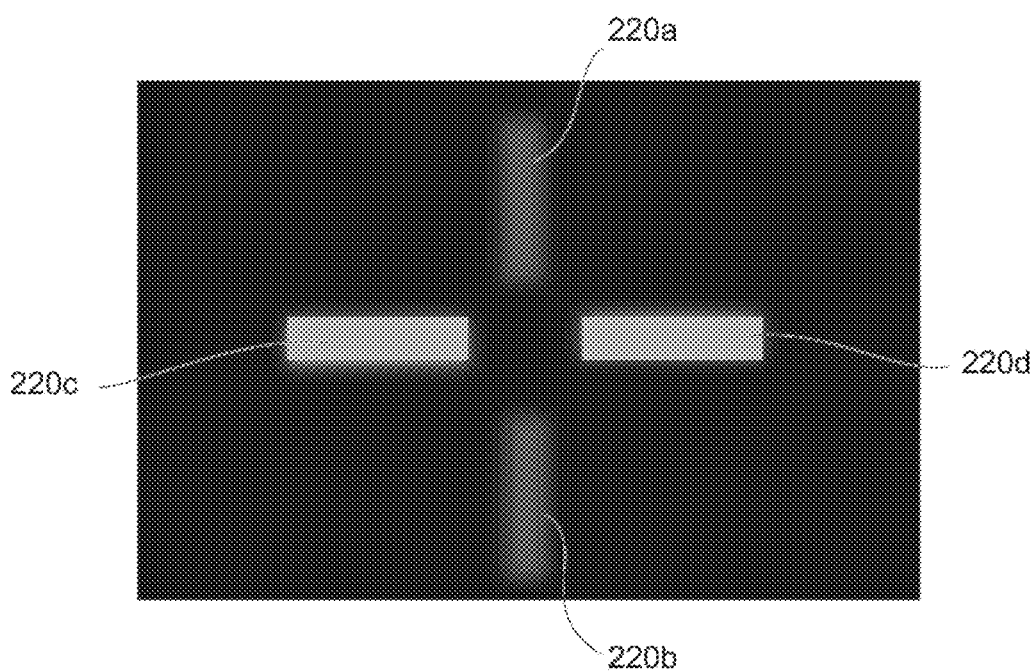
FIG. 4B is a diagram illustrating an image captured by the imaging unit in a case where the object is at a point B.

The details of the light source image captured by the imaging unit 22 will be described with reference to FIG. 4A and FIG. 4B. FIG. 4A is a diagram illustrating an image captured by the imaging unit 22 in a case where the object W is at a point A. FIG. 4B is a diagram illustrating an image captured by the imaging unit 22 in a case where the object W is at a point B.

The light transmitted through the slits 121a and 121b of the pattern plate 12A forms first light source images 220a and 220b through the first optical path L1, and the light transmitted through the slits 121c and 121d forms the second light source images 220c and 220d through the second optical path L2. Note that, in FIG. 3, the four slits 121a to 121d are illustrated as being separated from each other for convenience of description, but these four slits are sufficiently close to the size of the object W. That is, it is assumed that the first light source images 220a and 220b and the second light source images 220c and 220d corresponding to the respective slits 121a to 121d are respectively projected onto substantially predetermined positions (substantially the same position) of the object W in a plan view of the object W viewed along the traveling direction of the pattern light.

As described above, the light through the first optical path L1 and the light through the second optical path L2 are refracted at different refraction angles from each other in the lens 130. Therefore, the light through the first optical path L1 and the light through the second optical path L2 are focused on positions different from each other in the traveling direction of the pattern light (in the embodiment, an optical axis direction of the condenser lens 15, hereinafter also referred to as a "depth direction") (see FIG. 1). As such, for example, in a case where the object W is located at the point A relatively close to the condenser lens 15, as illustrated in FIG. 4A, the first light source images 220a and 220b through the first optical path L1 are clearly shown due to the in-focus, and the second light source images 220c and 220d through the second optical path L2 are blurredly shown due to the out-of-focus. On the other hand, in a case where the object W is at the point B relatively far from the condenser lens 15, as illustrated in FIG. 4B, the first light source images 220a and 220b through the first optical path L1 are blurredly shown due to the out-of-focus, and the second light source images 220c and 220d through the second optical path L2 are clearly shown due to the in-focus. Therefore, the difference between the first light source image and the second light source image includes information about a distance to the object W. In other words, a distance from a part (for example, the condenser lens 15) of the measurement device 1A to the object W can be measured based on characteristics (for example, sharpness, contrast, and the like) of the light source image observed by the imaging unit 22. Further, by adopting this configuration, the following advantages (1) to (4) are obtained.

(1) In the embodiment, the pattern light is divided into the first optical path L1 and the second optical path L2 to be emitted onto the object W, whereby the sharpness of the plurality of light source images projected at predetermined positions on the object can be compared with each other. Therefore, as disclosed in, for example, Patent document 2 above described, as compared to the configuration (hereinafter, the configuration is also referred to as a "comparative example") for comparing the sharpness of two light source images projected at positions separated from each other on the object, the distance to the object can be measured with high accuracy even in a case where the surface of the object is uneven or the surface of the object is inclined with respect to the illumination optical system. Further, even in a case of such a fine sized object onto which two light source images that are separated from each other are difficult to be projected, it is possible to measure the distance. In particular, since the degree of birefringence of the crystal is smaller than that of other uniaxial crystals, it is possible to reduce a deviation between the first light source image and the second light source image. Therefore, by making the lens 130 by the crystal, for example, precise measurement can be performed.

(2) In the comparative example, since the light for forming two light source images is transmitted through positions at which the distance from the optical axis of the lens are different, for example, aberration or distortion of the lenses such as coma aberration or astigmatism causes distortion of the image, and the measurement accuracy may be deteriorated. Alternatively, in order to correct the distortion, it is necessary to finely adjust the illumination optical system and store a distortion state of the image for each measurement device, and thus the design and calculation may be complicated. In this regard, according to the embodiment, since the first optical path L1 and the second optical path L2 are transmitted through substantially the same position of the lens, the influence of the distortion of the light source image caused by the optical system such as aberration and distortion of the lens can be suppressed, and the measurement accuracy can be improved as compared to the comparative example. Alternatively, since it is not necessary to correct the distortion, the design and an analysis can be simplified as compared to the comparative example, and the speed of measurement can be increased. In particular, since a region (paraxial region) close to the optical axis of the lens 130 is less affected by the aberration than the other regions, the first optical path L1 and the second optical path L2 are transmitted through the paraxial region, and thus it becomes easy to obtain these effects.

(3) In the comparative example, since two light source images are projected at positions different from each other in a plan view of the object, a plurality of sensors or a large sensor is required to observe the two light source images. In this regard, according to the embodiment, since the light source images through the first optical path L1 and the second optical path L2 are projected at substantially the same position in a plan view of the object W, therefore, only one sensor is sufficient, and it is possible to reduce the number of components or to reduce the size of the device.

(4) In the comparative example, since two light source images are transmitted through different positions of the lens, when applied to an optical system configured by an eccentric optical system or a free-curved surface, asymmetric blurring occurs in the image, and it is not possible to appropriately measure the distance to the object. In this regard, according to the embodiment, since the first optical path L1 and the second optical path L2 are transmitted through substantially the same position of the lens, they can also be applied to an optical system configured by an eccentric optical system and a free-curved surface. For example, the measurement device 1A can be applied to a head-up display, and it is possible to measure a distance from a driver in a car to a windshield and utilize it in an application such as prevention of drowsiness. Alternatively, the measurement device 1A can be used in various systems such as motion capture, projection mapping, and optometer.

Note that, in the embodiment described above, the example is described in which the optical path of the pattern light is divided into two optical paths, but the number of the optical paths is not limited to this, and equal to or more than three optical paths may be used.

Further, in the above-described embodiment, the example has been described in which the distance from a part of the measurement device 1A to the object W is measured, however, the measurement by the measurement device 1A is not limited to the above-described distance, and various other kinds of information can be acquired. For example, it may be used for object detection for detecting whether an object is present in the measurement range.

Additionally, in the embodiment described above, the example is described in which the slit 120 (transmissive portion) is formed on the pattern plate 12A and the pattern light is generated by the light transmitted through the slit 120, however, the arrangement of the transmissive portion and the dimming portion in the pattern plate may be reversed. That is, the pattern plate may have a configuration in which the pattern light is generated by having the transmissive portion, which is most part, for transmitting light and the dimming portion for dimming or blocking light. In this case, the transmissive portion may be a rough surface so as to diffuse light.

The method of shifting the position in the depth direction on which the pattern light is focused and obtaining light source images having different sharpness is not limited to the above-described embodiment, and can be realized by another configuration. Other configurations for obtaining light source images having different sharpness will be described below.

Figure 5:
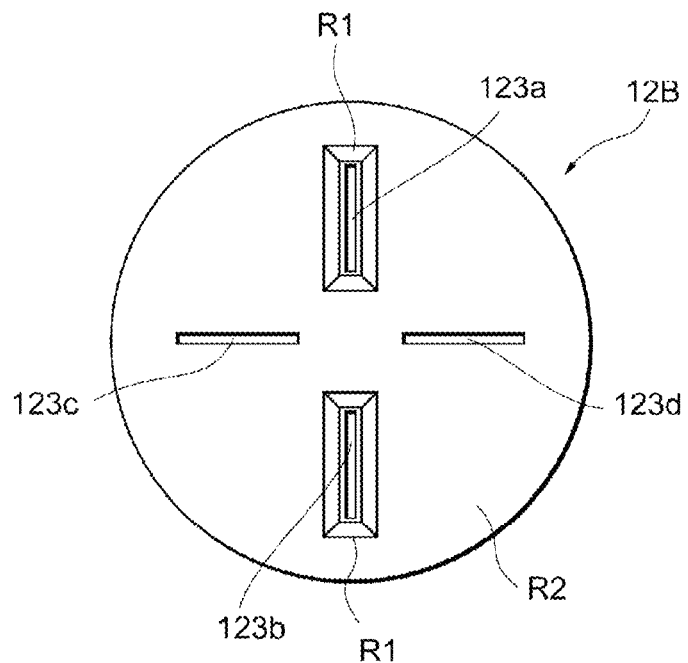
FIG. 5 is a plan view illustrating a planar structure of a pattern plate according to a first modified example.
Figure 6:
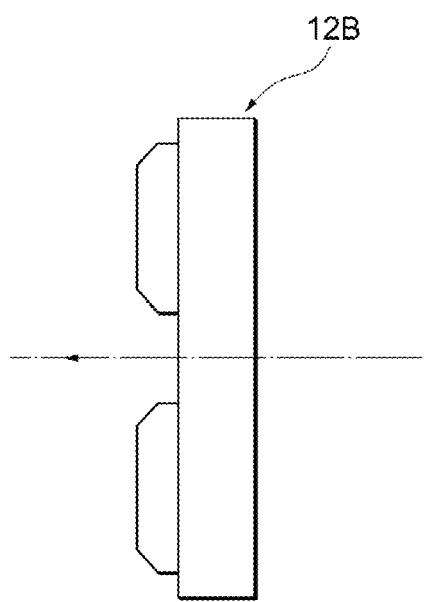
FIG. 6 is a side view illustrating a side structure of the pattern plate according to the first modified example.

FIG. 5 is a plan view illustrating a planar structure of a pattern plate 12B according to a first modified example of the pattern plate 12A, and FIG. 6 is a side view illustrating a side surface structure of the pattern plate 12B according to the first modified example of the pattern plate 12A. Note that in the following modified examples and embodiments, descriptions of matters common to those in the above-described embodiment will be omitted, and only different points will be described. In particular, similar actions and effects according to the same configuration will not be described in detail for each embodiment.

FIG. 5 and FIG. 6 are enlarged views of a region in which a cross-shaped slit is formed in the pattern plate 12B, as in the case of FIG. 3. The pattern plate 12B has regions in which the lengths in the traveling direction of the pattern light (i.e., the thickness of the pattern plate 12B) are different from each other. Two slits 123a and 123b are formed in a first region R1 that is relatively large in thickness, and two slits 123c and 123d are formed in a second region R2 that is relatively thin in thickness. That is, emission positions of light transmitted through the slits 123a and 123b, and emission positions of light transmitted through the slits 123c and 123d are different from each other in the traveling direction of the pattern light. Therefore, even in such a configuration, the pattern light is divided into the first optical path and the second optical path, and a plurality of light source images focused on different positions in the depth direction can be formed.

Note that, in the pattern plate 12B, the optical path of the pattern light can be divided by the thickness of the pattern plate 12B, therefore, the material of the lens corresponding to the lens 130 may not have birefringence, and may be a lens made of, for example, glass or the like. That is, in the modified example, it is possible to obtain the same effects as those of the above-described embodiment without using a polarizer or a birefringent lens.

Figure 7:
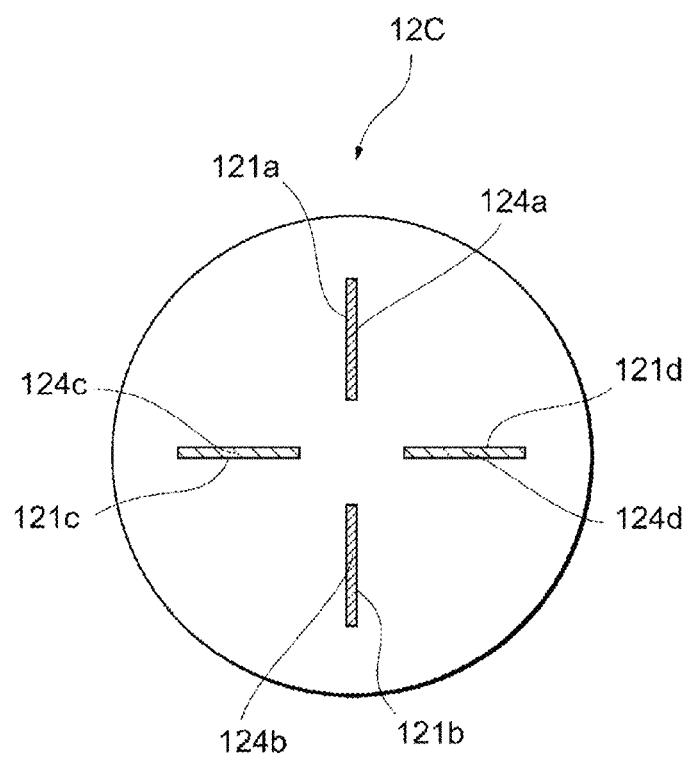
FIG. 7 is a plan view illustrating a planar structure of a pattern plate according to a second modified example.
Figure 8:
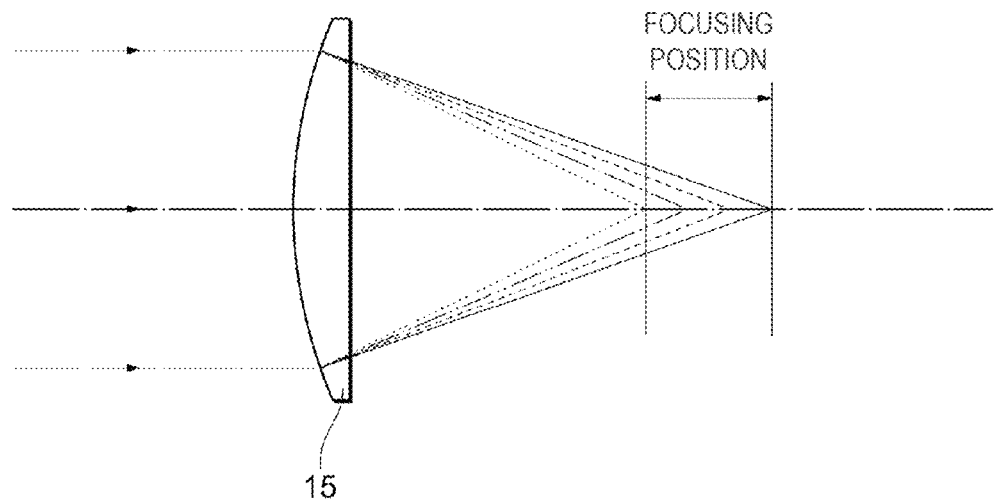
FIG. 8 is a diagram for explaining focusing of pattern light in a measurement device using the pattern plate according to the second modified example.

FIG. 7 is a plan view illustrating a planar structure of a pattern plate 12C according to a second modified example of the pattern plate 12A, and FIG. 8 is a diagram for explaining the focusing of the pattern light in the measurement device 1A using the pattern plate 12C according to the second modified example of the pattern plate 12A.

FIG. 7 is an enlarged view of a region in which a cross-shaped slit is formed in the pattern plate 12C, as in the case of FIG. 3. The four slits 121a to 121d that are similar to the pattern plate 12A illustrated in FIG. 3 are formed on the pattern plate 12C, and wavelength filters 124a to 124d that transmit light having wavelengths different from each other are provided in these four slits 121a to 121d. When the irradiation light is transmitted through the pattern plate 12C, the irradiation light is divided into light beams having four wavelengths different from each other.

In the modified example, the lens corresponding to the lens 130 described above may be a high-dispersion lens formed of, for example, flint glass. In the flint glass, an abbe number indicating an amount of displacement of the refractive index with respect to the wavelength of light is low, i.e., chromatic dispersion is large, and therefore, as illustrated in FIG. 8, a focusing position of the light has an extension in a predetermined range in the depth direction. In the modified example, since the pattern light includes light beams of four wavelengths, the focusing positions in the depth direction of the four light source images are different from each other. Therefore, among the four light source images captured in the imaging unit 22, an amount of received light of the light wavelength of the light source image most focused on the object W, becomes larger than amounts of received light of the light wavelengths of the other light source images. In other words, the distance to the object can be measured based on the wavelength of the light source image and an amount of the light received by the imaging unit 22.

Note that, in the modified example, the example is described in which the number of slits formed in the pattern plate 12C is four, and the wavelength of the wavelength filter includes four type, however, the number of slits and the number of wavelengths of the wavelength filter are not limited to four, and may be two or three, or equal to or more than five. Further, the wavelength filters do not necessarily need to be filters for transmitting light in a single wavelength band, and may be filters for transmitting light in a plurality of wavelength bands, such as a transmission filter of a complementary color.

Next, a measurement device according to a second embodiment of the present disclosure will be described with reference to FIG. 9A and FIG. 9B.

Figure 9A:
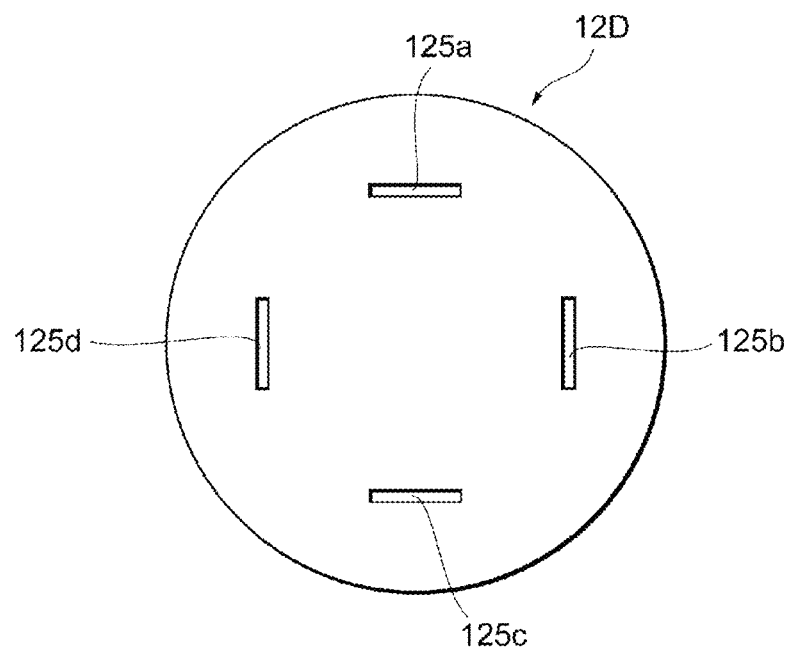
FIG. 9A is a plan view illustrating a planar structure of a pattern plate in a measurement device according to a second embodiment of the present disclosure.
Figure 9B:
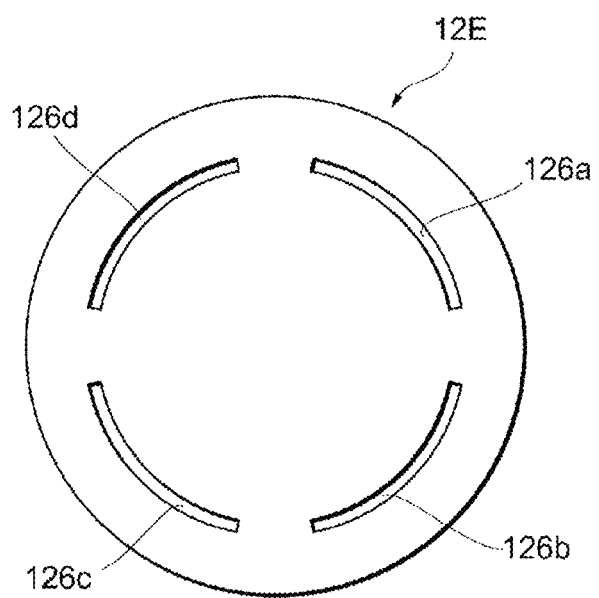
FIG. 9B is a plan view illustrating a planar structure of a pattern plate according to a third modified example.

FIG. 9A is a plan view illustrating a planar structure of a pattern plate 12D in the measurement device according to the second embodiment of the present disclosure. FIG. 9B is a plan view illustrating a planar structure of a pattern plate 12E according to a third modified example of the pattern plate. The measurement device according to the second embodiment differs from the measurement device according to the first embodiment described above in the position and shape of a slit formed in the pattern plate.

The pattern plate 12D illustrated in FIG. 9A includes four rectangular slits 125a to 125d formed at positions having equal distance from the optical axis in a plane direction with the optical axis of the illumination optical system 10A as a normal line. The pattern plate 12E illustrated in FIG. 9B includes four arc-shaped slits 126a to 126d formed at positions having equal distance from the optical axis in a plane direction with the optical axis of the illumination optical system 10A as a normal line. The slits 125a to 125d and 126a to 126d may be provided with a polarizer, for example, similarly to the above-described pattern plate 12A, or may be provided with a wavelength filter as in the case of the pattern plate 12C. Alternatively, the pattern plates 12D and 12E may have regions having different thicknesses as in the case of the pattern plate 12B. By applying such a configuration, similarly to the above-described measurement device 1A, the light transmitted through each pattern is focused on positions different from each other in the depth direction. Therefore, similarly to the measurement device 1A described above, the distance to the object W can be measured based on the sharpness of the plurality of light source images projected onto the object W.

Here, the plurality of slits formed in the pattern plates 12D and 12E is spaced apart from each other by the distance between the slits, as compared to the plurality of slits formed in the pattern plates 12A to 12C described above. Therefore, for example, in the pattern plate 12D, the first light source image that is transmitted through the slit 125a and is projected onto the object W through the first optical path and the second light source image that is transmitted through the slit 125b and is projected onto the object W through the second optical path may be projected at positions away from each other in a plan view of the object W. However, even in this case, since the respective slits are formed at positions in which the distances from the optical axis are equal to each other in the pattern plates 12D and 12E, it is considered that the light source images corresponding to the respective slits are symmetrically distorted even when distortion occurs due to aberration or distortion of the lens. In addition, when the first optical path and the second optical path are transmitted through the paraxial region of the lens, the influence thereof is very small. Therefore, even in the arrangement of the slits, the measurement accuracy can be improved as compared to the comparative example.

In this way, the shape, the number, and the arrangement of the slits formed in the pattern plate are not particularly limited. Further, the slits may be formed in combination.

Figure 11:
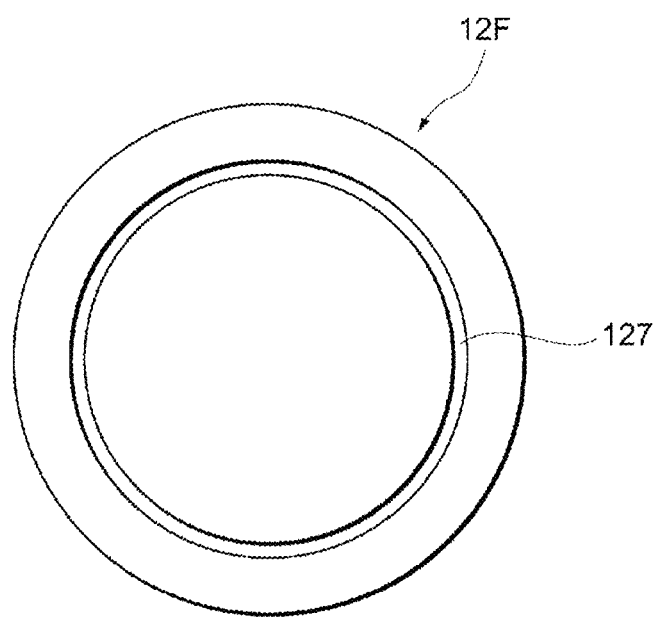
FIG. 11 is a plan view illustrating a planar structure of a pattern plate in the measurement device according to the third embodiment of the present disclosure.

FIG. 10 is a diagram illustrating an overall configuration of a measurement device according to a third embodiment of the present disclosure, and FIG. 11 is a plan view illustrating a planar structure of a pattern plate in the measurement device according to the third embodiment of the present disclosure.

A measurement device 1B according to the embodiment differs from the measurement device 1A described above in that an illumination optical system 10B includes a pattern plate 12F instead of the pattern plate 12A, and the optical path of the irradiation light is transmitted through a region other than the paraxial region, i.e., an off-axis region. That is, in the embodiment, the aberration that is symmetric in each optical path is not assumed. Therefore, the light from the light source 11 only needs to be focused, and it is also applicable to an optical system having no optical axis, for example, a free-curved surface system or the like. Note that, in the following description, a configuration using an off-axis region of an optical system having an optical axis will be described, but the present disclosure is not limited to this. Since the configuration of the observation system 20 may be the same as that of the above-described measurement device 1A, illustration thereof is omitted in FIG. 10.

As illustrated in FIG. 11, an annular slit 127 having the center of the optical axis is formed on the pattern plate 12F. It is assumed that the slit 127 has such a size that the light source image corresponding to the slit 127 is projected so as to have a planar spread with respect to the size of the object W in a plan view of the object W.

The lens 130 has refractive power different depending on the polarization direction of the transmitted light, for example, as similarly to the above-described first embodiment, and divides the irradiation light into the first optical path and the second optical path by a refractive action thereof. Specifically, the lens 130 may be a lens made by, for example, a uniaxial crystal. The optical axis of the lens may be parallel to or perpendicular to the optical axis of the illumination optical system 10B.

In the embodiment, the irradiation light is transmitted through the off-axis region of the lens 130. Here, due to the birefringence of the lens 130, the refractive index of the ordinary ray and the refractive index of the extraordinary ray are different from each other. That is, since the magnification of the lens is different between the ordinary ray and the extraordinary ray, the imaging unit 22 (not illustrated) observes a double image of the first light source image and the second light source image that are slightly shifted from each other on the object W (see FIG. 10). Whereby, the distance to the object W can be measured based on the sharpness and the positions of the first light source image and the second light source image. Note that "slightly shifted" is a deviation considered to the extent that the first light source image and the second light source image are substantially projected at the predetermined position of the object W in a plan view of the object W while they are sufficiently close with respect to the size of the object W. For example, in a case where one of the first light source image and the second light source image is clearly visible, the first light source image and the second light source image may be double images that are "slightly shifted" when at least a part of one light source image overlaps at least a part of a blurred region of the other light source image.

Figure 12A:
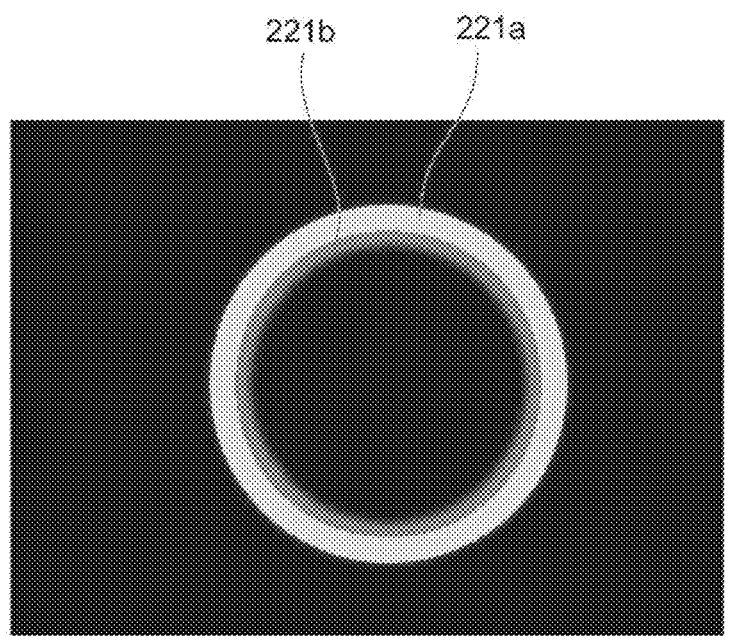
FIG. 12A is a diagram illustrating an image captured by the imaging unit in a case where the object is at the point A.
Figure 12B:
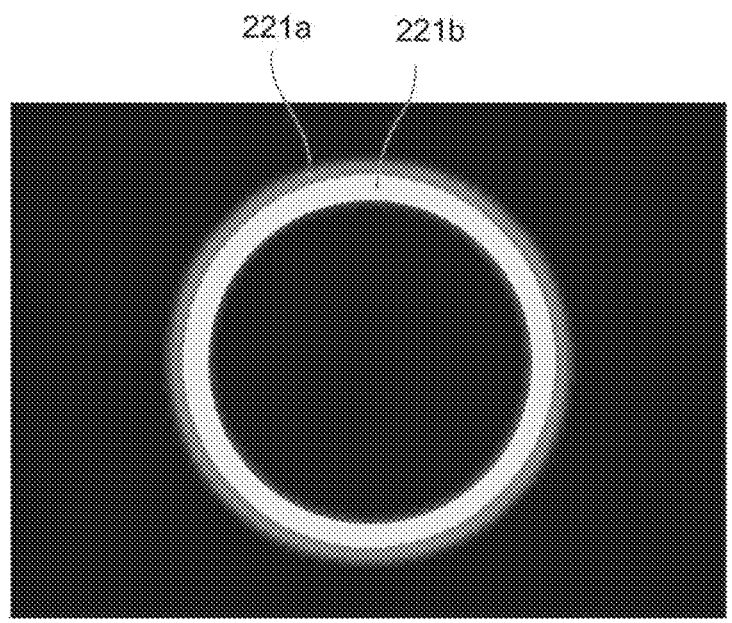
FIG. 12B is a diagram illustrating an image captured by the imaging unit in a case where the object is at the point B.

FIG. 12A is a diagram illustrating an image captured by the imaging unit 22 in a case where the object W is at the point A. FIG. 12B is a diagram illustrating an image captured by the imaging unit 22 in a case where the object W is at the point B.

As illustrated in FIG. 12A, in a case where the object W is located at the position A relatively close to the condenser lens 15, an annular first light source image 221a in an outer side portion is clearly shown due to the in-focus, and an annular second light source image 221b in an inner side portion is blurredly shown due to the out-of-focus. On the other hand, as illustrated in FIG. 12B, in a case where the object W is at the point B relatively far from the condenser lens 15, the annular first light source image 221a in the outer side portion is blurredly shown, and the annular second light source image 221b in the inner side portion is clearly shown due to the in-focus. As described above, the distance to the object W can be measured based on the sharpness of the double image that has deviation.

According to the embodiment, by the configuration described above, the object W can be measured without using the polarizer as compared to the measurement device 1A according to the first embodiment described above.

In addition, in the embodiment, since the light source image projected onto the object W has a planar spread with respect to the object W, the inclination and the shape of the object can be measured on the basis of the position and the sharpness of the light source image. This point will be further described with reference to FIG. 13 and FIG. 14.

Figure 13:
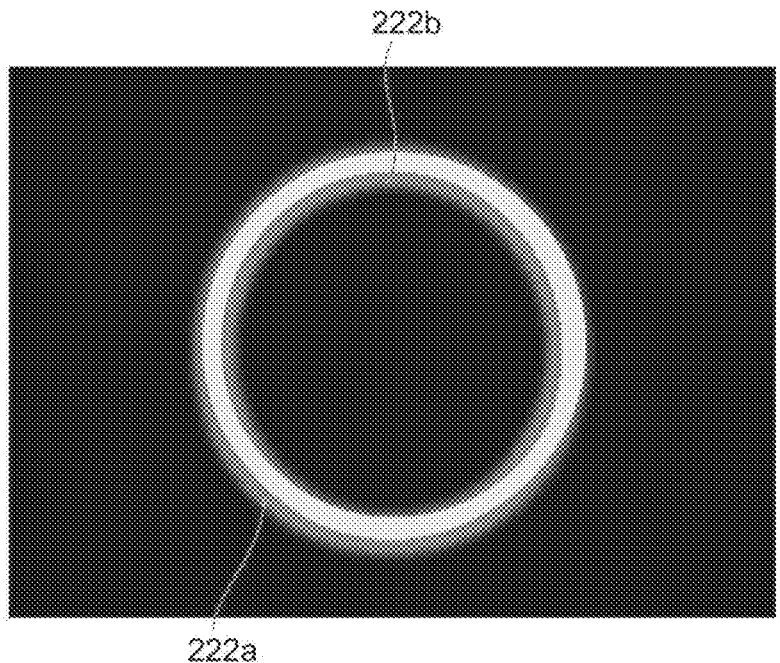
FIG. 13 is a diagram illustrating an image captured by the imaging unit in a case where an inclination of the object is measured using the measurement device according to the third embodiment of the present disclosure.

FIG. 13 is a diagram illustrating an image captured by the imaging unit 22 in a case where the inclination of the object is measured using the measurement device according to the third embodiment of the present disclosure.

In the example illustrated in FIG. 13, an annular second light source image 222b in an inner side portion is more unclear on the upper right side of the paper, and an annular first light source image 222a in an outer side portion is more unclear on the lower left side of the paper. From these images, it can be seen that the object has a flat plate shape having an inclination with respect to the illumination optical system 10B so as to be close to the condenser lens 15 on the upper right side of the paper, and to be distant from the condenser lens 15 on the lower left side of the paper.

Figure 14:
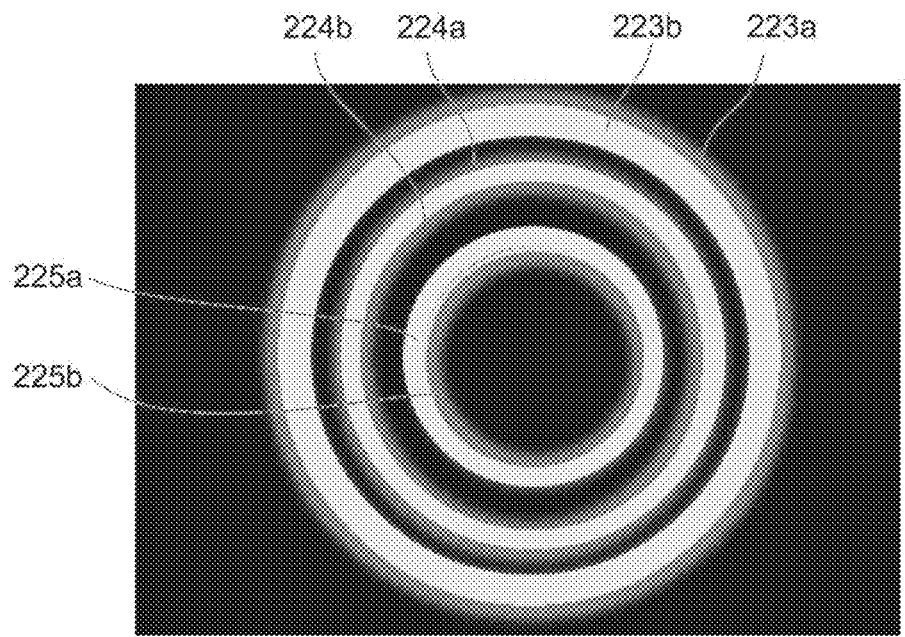
FIG. 14 is a diagram illustrating an image captured by the imaging unit in a case where a shape of the object is measured using the measurement device according to the third embodiment of the present disclosure.

FIG. 14 is a diagram illustrating an image captured by the imaging unit 22 in a case where the shape of the object is measured using the measurement device according to the third embodiment of the present disclosure.

In the example illustrated in FIG. 14, a pattern plate in which a plurality of (three in the embodiment) annular slits is formed concentrically around the optical axis is used. From the three slits, a first light source image 223a and a second light source image 223b, a first light source image 224a and a second light source image 224b, and a first light source image 225a and a second light source image 225b, which are respectively double, are projected. In the light source image corresponding to the outermost slit, the first light source image 223a in an outer side portion is more unclear than the second light source image 223b in an inner side portion, whereas in the light source image corresponding to the innermost slit, the second light source image 225b in the inner side portion is more unclear than the first light source image 225a in the outer side portion. Therefore, it can be seen that the object has a hemispherical shape that is closest to the condenser lens 15 on a side near the center of the paper and away from the condenser lens 15 on a side approaching the outer aide portion.

As described above, according to the configuration in which the pattern projected onto the object W has a planar spread with respect to the object W, the distance to the object W can be measured over a two-dimensional range.

Next, a laser beam projection system to which the above-described measurement device is applied will be described.

Figure 16A:
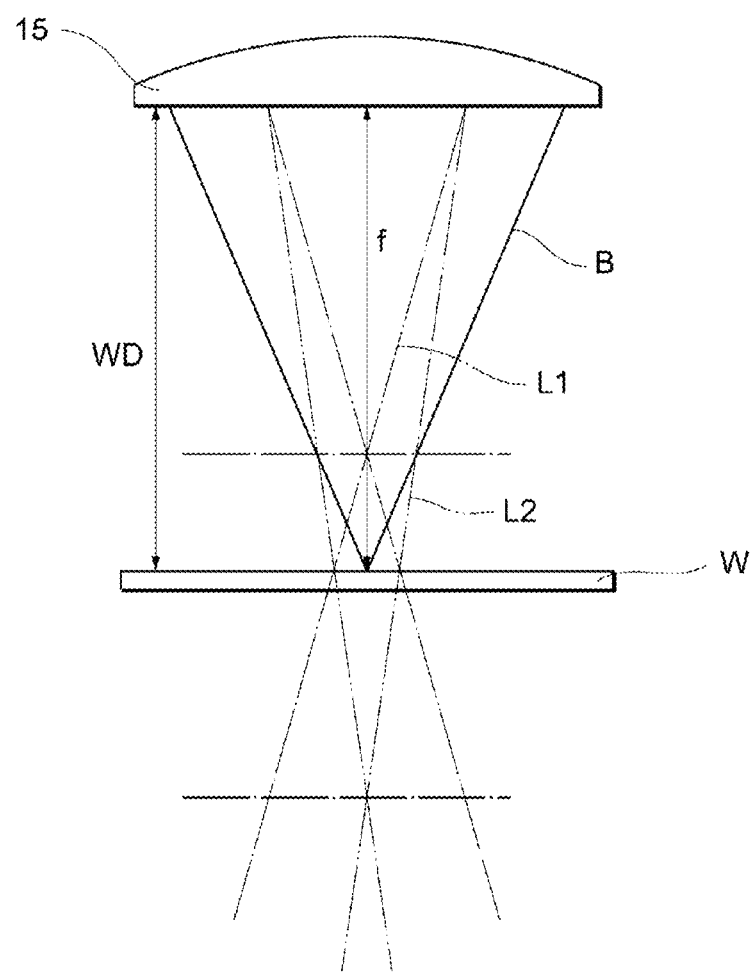
FIG. 16A is a diagram for explaining an operation of the laser beam projection system.
Figure 16B:
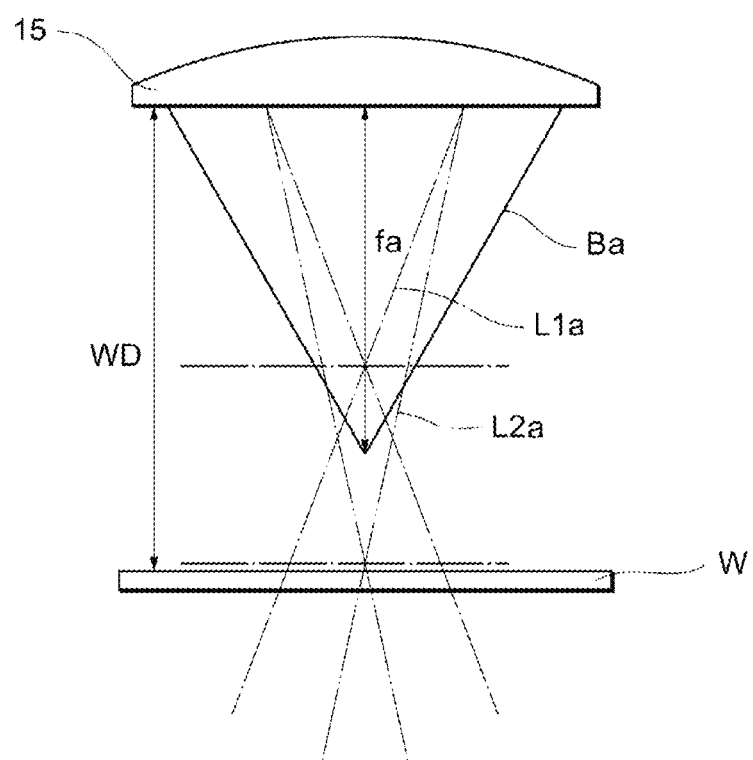
FIG. 16B is a diagram for explaining an operation of the laser beam projection system.
Figure 16C:
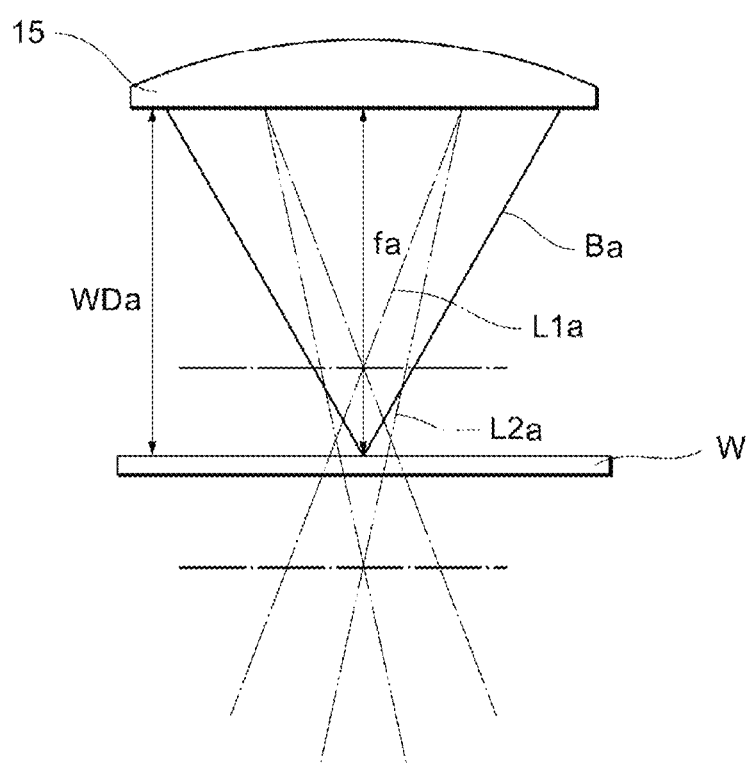
FIG. 16C is a diagram for explaining an operation of the laser beam projection system.

FIG. 15 is a diagram illustrating an overall configuration of a laser beam projection system to which the measurement device according to the first embodiment of the present disclosure is applied. FIG. 16A to FIG. 16C are diagrams for explaining operations of the laser beam projection system.

As illustrated in FIG. 15, a laser beam projection system 2 includes, for example, a light projecting system 30, a height adjustment system 40, and a control system 50 in addition to the illumination optical system 10A and the observation system 20 in the measurement device 1A described above.

The light projecting system 30 projects a laser beam B onto the object W through at least a part of the illumination optical system 10A of the measurement device 1A, and processes the object W. In the embodiment, the laser beam B is emitted onto the object W through the condenser lens 15 included in the illumination optical system 10A. The wavelength of the laser beam B is different from the wavelength of the pattern light emitted from the illumination optical system 10A, for example, and it is assumed that the laser beam B and the pattern light are distinguishable from each other in the observation system 20.

The height adjustment system 40 adjusts a working distance WD which is a distance from the condenser lens 15 to the object W in the light projecting system 30. By adjusting the working distance WD, the focusing position in the depth direction of the laser beam B can be adjusted to an appropriate position.

The measurement device 1A measures the working distance WD according to the above-described principle.

The control system 50 controls the height adjustment system 40 to maintain the working distance WD in a predetermined condition on the basis of the working distance WD measured by the measurement device 1A. The predetermined condition includes, for example, that the working distance WD and a focal length of the condenser lens 15 coincide with each other.

In the light projecting system 30 of the laser beam, for example, the refractive index of the condenser lens 15 changes as the temperature increases due to, for example, the irradiation of the laser beam, and thus the focal length of the condenser lens 15 may change. In this case, the working distance WD and the focal length of the condenser lens 15 do not coincide with each other, and there is concern that the focusing position of the laser beam does not match the object W. Note that, the increase in temperature may be caused by, for example, a light absorption heat generated due to the glass material or the coating material of the lens containing an impurity, a change in the ambient temperature, or an influence of radiation from the object.

For example, FIG. 16A illustrates a state where the working distance WD coincides with a focal length f of the condenser lens 15, and the focusing position of the laser beam B match the object W. At this time, the first light source image through the first optical path L1 in the measurement device 1A, and the second light source image through the second optical path L2 are initially set so as to have the same degree of sharpness, for example.

When the refractive index of the condenser lens 15 changes along with the temperature increases, the focal length f of the condenser lens 15 becomes shorter, and becomes a focal length fa (f>fa), as illustrated in FIG. 16B. Thus, the working distance WD and the focal length fa of the condenser lens 15 do not coincide with each other, and the focusing position of the laser beam B does not match the object W. At this time, the first optical path L1 and the second optical path L2 in the measurement device 1A also are transmitted through the same condenser lens 15 as the light projecting system 30, and therefore, the optical path changes similarly to the laser beam B, and becomes a first optical path L1$a$ and a second optical path L2$a$ (see FIG. 16B). As a result, in the plurality of light source images projected onto the object W, for example, one is clear and the other is blurred.

Based on the change in the sharpness of these light source images observed in the observation system 20, the control system 50 controls the height adjustment system 40 to adjust the working distance WD so that the sharpness of the two light source images becomes substantially equal to each other again. According to the above-described operation, as illustrated in FIG. 16C, the adjusted working distance WDa and the focal length fa of the condenser lens 15 coincide with each other again, and the focusing position of the laser beam Ba matches the object W.

Thus, according to the laser beam projection system 2 of the embodiment, the state in which the working distance WD and the focal length of the condenser lens 15 coincide with each other is maintained, therefore, processing can be performed without changing processing conditions in the middle or the quality of a processing unit varies at the beginning and the end of the processing, and the processing accuracy by the laser beam is improved. Further, in the laser beam projection system 2 according to the embodiment, since the condenser lens 15 is shared by the illumination optical system 10A and the light projecting system 30, it is possible to measure the change in the focal length of the condenser lens 15. Therefore, for example, as compared to a configuration in which the working distance coincides with the specific focal length of the condenser lens, the focusing position can be adjusted to the object W with higher accuracy.

Note that, in the above-described embodiment, the configuration in which the control system 50 controls the operation of the height adjustment system 40 is described, however, instead of this, for example, the light source image observed in the observation system 20 of the measurement device 1A may be displayed on a display, and the height adjustment system 40 may be manually operated while a user visually recognizes the display, thereby adjusting the working distance.

In the embodiment described above, an example is described in which the light projecting system 30 projects the laser beam B and processing the object W, however, the light projected by the light projecting system is not limited to the laser beam, and may be another type of light.

The exemplary embodiments of the present disclosure have been described above. The embodiments described above are for facilitating the understanding of the present disclosure, and are not intended to limit the present disclosure. The present disclosure can be modified or improved without departing from the gist thereof, and the present disclosure also includes equivalents thereof. In other words, modifications to the embodiments, which may be made by those skilled in the art as appropriate, are also included in the scope of the present disclosure as long as they have the features of the present disclosure. For example, the elements, the arrangement, the material, the condition, the shape, the size, and the like included in each embodiment are not limited to the examples described above, and may be appropriately changed. Furthermore, the elements included in each embodiment may be combined as technically possible, and the combinations thereof are also included in the scope of the present disclosure as long as they include the features of the present disclosure.

The invention claimed is:

1. A measurement device comprising:
   an illumination optical system configured to emit irradiation light having a predetermined pattern onto an object through a first optical path and a second optical path different from each other; and
   an observation system configured to observe a first light source image projected onto the object through the first optical path and a second light source image projected onto the object through the second optical path,
   wherein the illumination optical system is configured to focus light through the first optical path and light through the second optical path on predetermined positions in a plan view of the object viewed along a traveling direction of the irradiation light, the predetermined positions being different from each other in the traveling direction of the irradiation light,
   wherein the measurement device measures a distance to the object based on the first light source image and the second light source image observed by the observation system,
   wherein the illumination optical system includes a pattern plate and an optical member provided on an optical path of the irradiation light,
   wherein the pattern plate configures the predetermined pattern by arrangement of a transmissive portion for transmitting light and a dimming portion for blocking or dimming light,
   wherein the pattern plate includes a first region and a second region having different lengths from each other in the traveling direction of the irradiation light, and
   wherein the transmissive portion includes a plurality of slits respectively formed in the first region and the second region.

2. The measurement device according to claim 1,
   wherein the irradiation light is transmitted through an off-axis region of the optical member, and
   wherein the optical member has a different refractive power depending on a polarization direction, and divides the irradiation light into the first optical path and the second optical path by a refractive action.

3. The measurement device according to claim 2, wherein the optical member includes a lens made of crystal.

4. The measurement device according to claim 3, wherein the transmissive portion or the dimming portion has a plurality of annular shapes that are concentrically arranged in a plan view of the pattern plate viewed along the traveling direction of the irradiation light.

5. The measurement device according to claim 2, wherein the transmissive portion or the dimming portion has a plurality of annular shapes that are concentrically arranged in a plan view of the pattern plate viewed along the traveling direction of the irradiation light.

6. The measurement device according to claim 1,
wherein the transmissive portion includes a plurality of slits formed in the pattern plate, and a plurality of wavelength filters that are respectively provided in the plurality of slits and transmits light of different wavelengths from each other, and
wherein the optical member includes a high-dispersion lens that forms the first light source image and the second light source image in accordance with wavelengths of light respectively transmitted through the plurality of wavelength filters.

7. A measurement device comprising:
an illumination optical system configured to emit irradiation light having a predetermined pattern onto an object through a first optical path and a second optical path different from each other; and
an observation system configured to observe a first light source image projected onto the object through the first optical path and a second light source image projected onto the object through the second optical path,
wherein the illumination optical system is configured to focus light through the first optical path and light through the second optical path on predetermined positions in a plan view of the object viewed along a traveling direction of the irradiation light, the predetermined positions being different from each other in the traveling direction of the irradiation light,
wherein the measurement device measures a distance to the object based on the first light source image and the second light source image observed by the observation system,
wherein the illumination optical system includes a pattern plate and an optical member provided on an optical path of the irradiation light,
wherein the pattern plate configures the predetermined pattern by arrangement of a transmissive portion for transmitting light and a dimming portion for blocking or dimming light,
wherein the transmissive portion includes a plurality of slits formed in the pattern plate, and a plurality of polarizers that are respectively provided in the plurality of slits and transmits light in different polarization directions from each other, and
wherein the optical member has refractive power different depending on a polarization direction of light transmitted respectively through the plurality of polarizers, and divides the irradiation light into the first optical path and the second optical path by a refractive action.

8. A measurement device comprising:
an illumination optical system configured to emit irradiation light having a predetermined pattern onto an object through a first optical path and a second optical path different from each other; and
an observation system configured to observe a first light source image projected onto the object through the first optical path and a second light source image projected onto the object through the second optical path,
wherein the illumination optical system is configured to focus light on positions having equal distance from an optical axis of the illumination optical system in a plane direction with the optical axis as a normal, the positions being different from each other in a traveling direction of the irradiation light, in the first optical path and the second optical path,
wherein the measurement device measures a distance to the object based on the first light source image and the second light source image observed by the observation system,
wherein the illumination optical system includes a pattern plate and an optical member provided on an optical path of the irradiation light,
wherein the pattern plate configures the predetermined pattern by arrangement of a transmissive portion for transmitting light and a dimming portion for blocking or dimming light,
wherein the transmissive portion includes a plurality of slits formed in the pattern plate, and a plurality of polarizers that are respectively provided in the plurality of slits and transmits light in different polarization directions from each other, and
wherein the optical member has refractive power different depending on a polarization direction of light transmitted respectively through the plurality of polarizers, and divides the irradiation light into the first optical path and the second optical path by a refractive action.

9. The measurement device according to claim 8,
wherein the pattern plate includes a first region and a second region having different lengths from each other in the traveling direction of the irradiation light, and
wherein the transmissive portion includes a plurality of slits respectively formed in the first region and the second region.

10. The measurement device according to claim 8,
wherein the irradiation light is transmitted through an off-axis region of the optical member, and
wherein the optical member has a different refractive power depending on a polarization direction, and divides the irradiation light into the first optical path and the second optical path by a refractive action.

11. The measurement device according to claim 10, wherein the optical member includes a lens made of crystal.

12. The measurement device according to claim 10, wherein the transmissive portion or the dimming portion has a plurality of annular shapes that are concentrically arranged in a plan view of the pattern plate viewed along the traveling direction of the irradiation light.

* * * * *